United States Patent Office 2,910,470
Patented Oct. 27, 1959

2,910,470

3-OXOCONA-1,4-DIENINE AND INTERMEDIATES FOR ITS PREPARATION

John S. Baran, Chicago, and Raphael Pappo, Skokie, Ill., assignors to G. D. Searle & Co., Chicago, Ill., a corporation of Delaware No Drawing. Application November 20, 1958
Serial No. 775,097

2 Claims. (Cl. 260—239.5)

The present invention relates to 3-oxocona-1,4-dienine of the structural formula

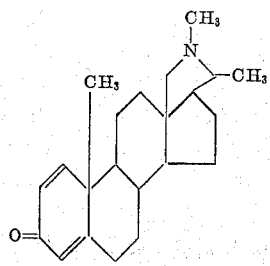

its salts and intermediates for their production.

The foregoing dienine is conveniently prepared from conessine. Conessine is first converted to 3-hydroxy-5-conenine by the procedure described in a copending application by R. Pappo, Serial No. 736,963, filed May 22, 1958. The resulting conenine derivative can be hydrogenated, typically in the presence of a noble metal catalyst, to yield 3β-hydroxyconanine which is then oxidized with chromic acid to yield the 3-oxoconanine. Treatment of the 3-oxoconanine with bromine and hydrogen bromide in a lower alganoic acid yields the 2,4-dibromo-3-oxoconanine. It will be understood that the configuration of the bromine atoms in the 2- and 4-position is immaterial for the following reaction, in which the dibromo compound is heated with pyridine, or an alkylated pyridine such as picoline, lutidine and preferably with collidine, to form the 3-oxocona-1,4-dienine.

The base forms salts with inorganic and strong organic acids including sulfuric, phosphoric, hydrochloric, hydrobromic, hydroiodic, sulfamic, citric, lactic, maleic, nicotinic, malic, succinic, tartaric, cinnamic, acetic, benzoic, gluconic, ascorbic, and related acids. It also forms quaternary ammonium salts with a variety of organic esters of sulfuric, hydrohalic and aromatic sulfonic acids. Among such esters are methyl chloride, bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide. The compounds of this invention are anti-fungal agents and are particularly active against trichoplyton mentagrophytes.

The invention will be described in further detail in the following examples which are given for the purpose of illustration only, and are not to be construed as limited thereby in spirit or in scope. It will be obvious to those skilled in the art that modifications in materials and methods can be adopted without departing from the invention. In these examples quantities are indicated in parts by weight.

*Example 1*

To a solution of 5 parts of 3-hydroxy-5-conenine and 50 parts of methanol are added 100 parts of 0.6-M hydrochloric acid and 0.15 part of platinum oxide. The mixture is stirred until hydrogen ceases to be absorbed. Then methanol is added to the mixture until the precipitate has dissolved. After filtration the filtrate is treated with excess aqueous sodium hydroxide, concentrated on a steam bath, and cooled. The resulting 3-hydroxyconanine is collected on a filter, washed with water, dried, and then recrystallized from the mixture of ether and petroleum ether. The product melts at about 169–171° C.

*Example 2*

To a stirred solution of 15 parts of this product and 100 parts of acetic acid are added in a course of 5 minutes, 19.1 parts of a mixture of 12.3 parts of sulfuric acid, 100 parts of water and 26.7 parts of chromic acid, while the temperature is maintained below 22° C. After 3 additional minutes the mixture is treated with 5 parts of 2-propanol and diluted with water. The green aqueous solution is then extracted thoroughly with chloroform. The chloroform extract is washed with dilute aqueous sodium hydroxide and then with water, dried over sodium sulfate and evaporated to dryness under vacuum. Crystallization of the residue from petroleum ether yields 3-oxoconanine melting at about 145–146° C.

*Example 3*

To a solution of 4.7 parts of 3-oxoconanine, 20 parts of acetic acid, and 40 parts of 1-M hydrogen bromide in acetic acid there is added with stirring over a period of 35 minutes a solution of 4.63 parts of bromine and 40 parts of acetic acid. The mixture is then stirred at 40° C. for one hour and cooled. The resulting precipitate is collected on a filter, washer with a small amount of acetic acid, then with ether, and dried. The crude product is crystallized from ethanol. There is thus obtained the hydrobromide of 2,4-dibromo-3-oxoconanine which softens at about 150–160° C. and melts at about 185–188° C. Treatment of an aqueous solution of the salt with sodium carbonate, ether extraction and evaporation of the solvent from the extract at room temperature under vacuum yields the relatively unstable base of the formula

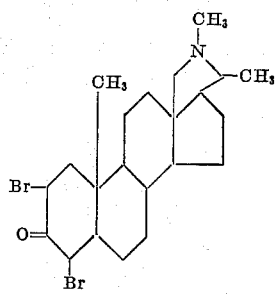

*Example 4*

A mixture of one part of 2,4-dibromo-3-oxoconanine hydrobromide and 5 parts of s-collidine is stirred at reflux for seven minutes and then cooled. The mixture is then stirred vigorously with 100 parts of ether and 50 parts of saturated aqueous sodium bicarbonate. The organic layer is separated, dried over anhydrous sodium sulfate and evaporated to dryness under vacuum. The residue is triturated with petroleum ether and a small amount of insoluble material is separated by filtration and discarded. The filtrate is evaporated to dryness under vacuum to yield 3-oxocona 1,4-dienine of the structural formula

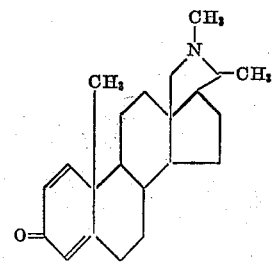

A methanolic solution shows an ultraviolet maximum at 242 millimicrons with a molecular extinction coefficient of about 14,000. Infrared maxima are observed in chloroform at about 3.40, 6.01, 6.17, 6.24, 7.24, 8.04, 8.53, and 11.24 microns.

*Example 5*

A solution of 0.2 part of 3-oxocona 1,4-dienine, 15 parts of methanol, and 3 parts of iodomethane is refluxed for two hours and evaporated to dryness. The residue is triturated with acetone. The resulting precipitate is collected on a filter and washed with acetone. On recrystallization from acetone is obtained the methiodide of 3-oxocona 1,4-dienine which melts at about 259–261° C. Infrared maxima are observed at 3.40, 5.98, 6.15, 6.23, 7.72, 10.66, and 11.33 microns. The methanolic solution shows an ultraviolet maximum at 223 millimicrons with a molecular extinction coefficient of about 20,600. An additional maximum is seen at 244 millimicrons with an extinction coefficient of 15,000. A rotation of a 0.27% chloroform solution $\alpha_D$ is +59.6°.

What is claimed is:
1. A compound of the structural formula

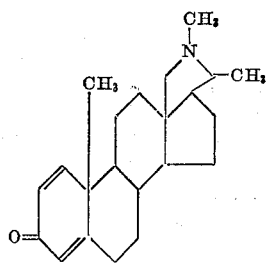

2. A compound of the structural formula

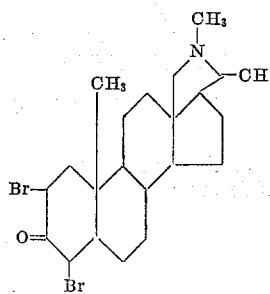

References Cited in the file of this patent
UNITED STATES PATENTS 2,740,781   Mueller _____ Apr. 3, 1956

OTHER REFERENCES

Haworth et al.: J. Chem. Soc., vol. 1957, pages 4973–83.